United States Patent [19]

Sugimori et al.

[11] Patent Number: 4,921,909

[45] Date of Patent: May 1, 1990

[54] METHOD FOR PRODUCING THERMOPLASTIC RESINS

[75] Inventors: Teruhiko Sugimori, Otake; Noriyuki Tajiri, Toyohashi; Yutaro Fukuda, Otake, all of Japan

[73] Assignee: Mitsubishi Rayon Company, Ltd., Tokyo, Japan

[21] Appl. No.: 946,057

[22] Filed: Dec. 24, 1986

[30] Foreign Application Priority Data

Dec. 25, 1985 [JP] Japan .................. 60-295370
Dec. 26, 1985 [JP] Japan .................. 60-293953

[51] Int. Cl.$^5$ .............................................. C08L 51/00
[52] U.S. Cl. .......................................... 525/64; 525/67;
 525/73; 525/80; 525/86; 525/197; 525/100;
 525/103; 525/106; 528/485; 528/486; 528/488;
 528/490; 528/491; 528/493; 528/497; 528/498;
 528/501
[58] Field of Search ............... 525/106, 103, 73, 86,
 525/197, 64, 67, 80, 83; 528/501, 502, 497, 503,
 485–486, 488, 490–491, 493, 498; 523/340

[56] References Cited

U.S. PATENT DOCUMENTS

| | | | |
|---|---|---|---|
| 3,592,878 | 7/1971 | Kromolicki | 525/64 X |
| 3,700,622 | 10/1972 | Terenzi | 523/340 X |
| 4,080,352 | 3/1978 | Wallace | 524/504 X |
| 4,186,047 | 1/1980 | Salmon | 528/501 X |
| 4,284,737 | 8/1981 | Kruse et al. | 525/243 |
| 4,290,932 | 9/1981 | Wright et al. | 525/243 X |
| 4,369,278 | 1/1983 | Kasahara et al. | 264/102 X |
| 4,578,455 | 3/1986 | Pipper et al. | 528/501 |
| 4,690,974 | 9/1987 | Sugimori et al. | 528/501 X |

FOREIGN PATENT DOCUMENTS

| | | | |
|---|---|---|---|
| 0032769 | 7/1981 | European Pat. Off. | 525/497 |
| 2144434 | 3/1985 | United Kingdom | 525/63 |

*Primary Examiner*—Joseph L. Schofer
*Assistant Examiner*—F. M. Teskin
*Attorney, Agent, or Firm*—Oblon, Spivak, McClelland, Maier & Neustadt

[57] ABSTRACT

Emulsion polymerization type thermoplastic resin of high performance can be produced by the following methods: namely, a method which comprises removing an aqueous phase from a two-phase mixture comprising a latex of polymer (1) produced by emulsion polymerization, a water soluble agent (2) in an amount of 10% by weight or less of said polymer (1) which is capable of coagulating the latex of polymer (1) and an organic agent (3) in an amount of 0.1 to 6 times the weight of said polymer (1) which is capable of dissolving both an uncrosslinked polymer contained in said polymer (1) and thermoplastic polymer (4) mentioned hereinbelow and has a solubility in water of 5% by weight or less at 25° C., then melt-mixing molten polymer which has been subjected to a first devolatilization by a thermal means with thermoplastic resin (4) and then subjecting the mixture to a second devolatilization; and a method which comprises removing an aqueous phase from a two-phase mixture comprising a latex of polymer (1) produced by emulsion polymerization, a water soluble agent (2) in an amount of 10% by weight or less of said polymer (1) which is capable of coagulating the latex of polymer (1) and an organic agent (3) in an amount of 0.1 to 6 times the weight of said polymer (1) which is capable of dissolving an uncrosslinked polymer contained in said polymer (1) and has a solubility in water of 5% by weight or less at 25° C. and then melt-mixing the molten polymer from which volatile component has been devolatilized by a thermal means with thermoplastic polymer (4').

8 Claims, No Drawings

METHOD FOR PRODUCING THERMOPLASTIC RESINS

This invention relates to a method for producing a thermoplastic resin of high performance by mixing a polymer prepared by emulsion polymerization and other thermoplastic polymer characterized in that the polymer is efficiently extracted with an organic agent and a water soluble agent capable of coagulating the polymer contained in emulsion polymer latex.

Emulsion polymerization is a very useful process for production of resins having high functions, but is inferior to bulk polymerization and suspension polymerization in production cost, disposal of waste water, etc.

Therefore, usually, a polymer prepared by emulsion polymerization in a possible minimum amount is mixed with a polymer prepared by a process other than the emulsion polymerization to produce a resin having high function as a whole.

Generally, most of the rubber modified thermoplastic resins represented by ABS resins are those obtained by mixing and kneading a polymer obtained by graft polymerization of a vinyl monomer on a rubber latex and a thermoplastic resin. Usually, production of them comprises the steps of emulsion polymerization, coagulation, solidifying, dehydration, drying, blending, and melt extrusion. The emulsion polymerization step is a step of producing a polymer latex by emulsion polymerizing or emulsion graft polymerizing an acrylic monomer, vinyl cyanide monomer, vinyl aromatic monomer, a diene rubber latex, vinyl rubber latex, natural rubber latex, silicone rubber latex and the like. The coagulation and solidifying steps are steps of adding a coagulant such as polyvalent salts and acids to the polymer latex to destroy the emulsion state and coagulate the polymer and solidifying the polymer into rigid powders. The dehydration and drying steps are steps of removing the aqueous phase from the mixture of the powdered polymer and water by a means such as centrifugal dehydration or the like and further drying the powders by a means such as flow drying method to obtain dry powders. The blending step is a step of blending said dry powders with other thermoplastic resins and additives such as stabilizer, lubricant, polasticizer, etc. The melt extrusion step is a step of melting, kneading and extruding the blend materials into strands by screw extruder and pelletizing them.

One of the problems in production brought about in the above method of producing thermoplastic resins comprising the above steps including emulsion polymerization is firstly that much heat is required. This is because of the use of a large quantity of hot-air at the drying step.

Some proposals have been made to improve the conventional methods of production of thermoplastic resins which have problems leading to reduction of industrial competitiveness and some of them have been industrially practised. One of them has aimed at reduction of heat used at the drying step and utilized a screw extruder generally called a dehydration extruder which has a dehydration function. The proposed methods of this type are roughly classified into those according to which the blend of the wet polymer powders after subjected to coagulation, solidification and dehydration and other thermoplastic resins and additives or the wet polymer powders alone is fed to said dehydration extruder and those according to which polymer latex and coagulant together with other thermoplastic resins and additives, if necessary, are fed to said dehydration extruder.

According to these methods the reduction of the heat used can be expected because the drying step at which a large quantity of hot air is used is omitted. However, the former method has the problems that continuous operation is difficult because polymer fine powder clogs in aperture provided at a barrel when water contained in the wet polymer powder is removed by a dehydration mechanism and is discharged from said aperture and/or barrel and screw wears out due to compression of unmelted powder for removal of water and furthermore apparatuses made of special materials are required. Besides, generally, 20–30% by weight (dry base) of water contained in the starting materials remains without being removed as droplet and this remaining water must be evaporated and removed at a vent portion provided in the dehydration extruder by a thermal means. Thus, heat load of the dehydration extruder increases to cause reduction of treating capacity of the extruder.

On the other hand, according to the latter method where polymer latex and coagulant are fed to dehydration extruder, water is removed at the step of heating and solidifying a creamy mixture of the latex and the coagulant and is discharged from anaperture provided at the barrel. The shape of polymer particles formed according to this method is very unstable and leakage of polymer from the aperture, clogging of the aperture and wearing out of compression parts are severer than the former method which uses wet polymer powder. Thus, this method has not yet been practically employed.

As mentioned above, many proposals have been made for production of emulsion polymerization type thermoplastic resins. However, at present, there have not yet been provided such methods according to which the reduction of heat required at production step of resins can be attained and the desired resins of high quality and high competitiveness can be obtained. Under the circumstances, this invention provides a most highly rationalized method of production of emulsion polymerization type thermoplastic resins with saving of energy.

The first method of this invention is a method for producing a thermoplastic resin which comprises removing an aqueous phase from a two-phase mixture comprising a latex of polymer (1) produced by emulsion polymerization, a water soluble agent (2) in an amount of 10% by weight or less of said polymer (1) which is capable of coagulating the latex of polymer (1) and an organic agent (3) in an amount of 0.1 to 6 times the weight of said polymer (1) which is capable of dissolving both an uncrosslinked polymer contained in said polymer (1) and thermoplastic polymer (4) mentioned hereinbelow and has a solubility in water of 5% by weight or less at 25° C., then melt-mixing molten polymer which has been subjected to a first devolatilization by a thermal means with thermoplastic polymer (4) and then subjecting the mixture to a second devolatilization.

The second method of this invention is a method for producing a thermoplastic resin which comprises removing an aqueous phase from a two-phase mixture comprising a latex of polymer (1) produced by emulsion polymerization, a water soluble agent (2) in an amount of 10% by weight or less of said polymer (1) which is capable of coagulating the latex of polymer (1) and an organic agent (3) in an amount of 0.1 to 6 times the weight of said polymer (1) which is capable of dissolving an uncrosslinked polymer contained in said polymer (1) and has a solubility in water of 5% by weight or less at 25° C. and then melt-mixing the molten polymer from which volatile component has been devolatilized by a thermal means with thermoplastic polymer (4'). This thermoplastic resin (4') is not necessarily soluble in the organic agent (3).

This invention is especially useful in production of a rubber modified thermoplastic resin by graft polymerization of a glassy polymer on a rubber-like polymer to impart functions. In this case, the rubber polymer latexes usable include all of those which have been used as raw materials for rubber modified thermoplastic resins. As examples thereof, mention may be made of latexes of diene rubbers such as polybutadiene, polyisoprene, SBR, etc., those of olefin rubbers such as ethylene-propylene rubber, ethylene-vinyl acetate rubber, etc., those of acrylic rubbers such as polyethyl acrylate, polybutyl acrylate, etc., those of silicone rubbers such as polydimethylsiloxane, etc. These rubber polymer latexes may not necessarily be used in this invention, but they may be used singly or in combination of two or more.

Vinyl monomers are used for emulsion polymerization carried out in the presence or absence of these rubber polymers because the polymerization method is radical polymerization and it is common to choose the optimum vinyl monomers considering compatibility and adhesion with the thermoplastic polymers to be blended. The same thing can be applied to this invention. Thus, the vinyl monomers usable in this invention include those which have been hitherto used, namely, vinyl cyanide monomers such as acrylonitrile, methacrylonitrile, etc., vinyl aromatic monomers such as styrene, α-methyl styrene, etc., methacrylates such as methyl methacrylate, phenyl methacrylate, etc., halogenated vinyl monomers such as methyl chloroacrylate, 2-chloroethyl methacrylate, etc. and other radical polymerizable monomers. These monomers may be used alone or in combination of two or more. Vinyl cyanide monomers, vinyl aromatic monomers and methacrylate monomers are preferred in this invention.

It is necessary in this invention to mix the latex of polymer (1) obtained by emulsion polymerization with organic agent (3) and water soluble agent (2) having coagulating ability. This operation is inherent in this invention.

The organic agents (3) used in this invention are those which have a solubility in water of 5% by weight or less, preferably 2% by weight or less at 25° C., namely, which cannot be contained in an amount of more than 5 g, preferably more than 2 g in 100 g of aqueous solution at 25° C. and which can dissolve uncrosslinked polymer contained in polymer (1) obtained by emulsion polymerization and thermoplastic polymer (4). This organic agent can be used in an amount of 0.1-6 times, preferably 0.2-2 times the weight of polymer (1) obtained by emulsion polymerization.

When the solubility of the organic agent in water at 25° C. is more than 5% by weight, the aqueous phase of the two phases separated in the mixture becomes cloudy.

When amount of the organic agent (3) is less than 0.1 time the weight of polymer (1) the effect aimed at in this invention cannot be developed. On the other hand, when the organic agent (3) is used in an amount of more than 6 times the polymer (1), a large quantity of heat is required for removal of the organic agent. These are not preferred from the industrial viewpoint.

As examples of the organic agents (3) used in this invention, mention may be made of non-polymerizable organic agents such as petroleum ether, benzene, toluene, xylene, ethylbenzene, diethylbenzene, p-cymene, tetralin, methylene chloride, chloroform, carbon tetrachloride, trichlene, chlorobenzene, epichlorohydrin, methyl-n-propyl ketone, acetophenone, n-propyl acetate, n-butyl acetate, 1-nitropropane, etc. and polymerizable organic agents such as styrene, methyl methacrylate, α-methylstyrene, etc. These are mere examples and this invention is never limited to these examples and any organic agents which satisfy the above conditions may be used sinly or in combination of two or more.

The water soluble agents (2) having coagulating ability used in this invention include any materials which are water soluble and have an ability to coagulate the latex of polymer (1) used and may be used in an amount of 10% by weight or less, preferably 3% by weight or less of said polymer (1) for not causing deterioration of quality of resins to be produced. Generally, the water soluble agent (2) is used in an amount of at least 0.2% by weight. As examples of these materials, mentioned may be made of salts of polyvalent metals such as aluminum sulfate, aluminum chloride, aluminum nitrate, magnesium sulfate, calcium chloride, calcium nitrate, etc., inorganic acids such as sulfuric acid, hydrochloric acid, nitric acid, etc. and organic acids such as acetic acid, propionic acid, etc. These may be used singly or in combination of two or more. In this invention, preferred are salts of polyvalent metals and inorganic acid.

According to this invention, when latex of polymer (1), the organic agent (3) and the water soluble agent (2) having coagulating ability are mixed, the mixture separates into an organic phase composed of polymer (1), the organic agent (3), a slight amount of a polymerization assistant soluble in said organic agent, etc. and an aqueous phase composed of the water soluble agent (2), water, a slight amount of a water soluble polymerization assistant, etc.

At this time, the organic phase changes to a highly viscous state and is completely separated from the aqueous phase and so removal and discharging of the aqueous phase can be easily accomplished; wearing out of apparatus due to compression of solid power can be avoided; and evaporation latent heat of the organic agent is small and generally the heat load to the extruder is 3-15% by weight (dry base) in terms of water for the polymer produced by emulsion polymerization to make it possible to hold down the reduction of capacity of the extruder the minimum. In these respects, this invention is superior to the above-mentioned method of using a dehydration extruder.

The aqueous phase and the organic phase are separated from the two-phase mixture by conventional means such as decantation, centrifugal dehydration, compression dehydration, etc. to obtain the organic phase mainly composed of polymer (1) and organic agent (3). In the first method, a part of said organic agent (3) and a slight amount of remaining water are removed by conventional devolatilization means and the remainder was melt-mixed with another thermoplastic polymer (4) in the presence of remaining organic agent (3). Then said remaining organic agent (3) is removed by conventional devolatilization means whereby the desired thermoplastic resin of high performance can be produced in a high efficiency and in a rationalized manner. In the second method, a whole of organic agent and a slight amount of remaining water included in said organic phase are removed by conventional devolatilization means and the remainder was melt-mixed with another thermoplastic polymer (4') whereby the desired thermoplastic resin of high performance can be produced in a high efficiency and in a rationalized manner.

Thermoplastic polymer (4) and thermoplastic polymer (4') include various general-purpose resins, engineering resins, etc. and as typical examples thereof, mention may be made of acrylonitrile-styrene copolymers, acrylonitrile-α-methylstyrene copolymers, acrylonitrile-α-methylstyrene-N-phenylmaleimide copolymers, polystyrene, polymethyl methacrylate, polyvinyl chloride, polycarbonate, polysulfone, polyethylene terephthalate, polytetramethylene terephthalate, etc.

These thermoplastic polymers (4) and thermoplastic polymer (4') may be used singly or in combination of two or more. In this invention, acrylonitrile-styrene copolymers, polycarbonate, polyvinyl chloride, polysulfone, etc. are preferred.

The thermoplastic polymers used in this invention are never limited to those enumerated above and there may be used any polymers which are capable of being molten with heat, but in many cases, melt viscosity of the thermoplastic polymers used is different from that of the polymers produced by emusion polymerization and melt-mixing of the polymers greatly different in melt viscosity requires a large power. On the other hand, in the presence of an organic agent capable of dissolving the polymers, mixing of even such polymers greatly different in melt viscosity is very easy because the polymers have solution-like property. Therefore, the first method of this invention is conspicuously advantageous when thermoplastic resin (4) and polymer (1) produced by emulsion polymerization are different in their melt viscosity. Furthermore, the thermoplastic polymer to be mixed also contains a slight amount of volatile matters such as water, volatile polymerization assistant, remaining monomers, etc. and it is preferred from the viewpoint of quality of products to remove these matters as much as possible.

The first method of this invention is very useful as a means to mix a polymer produced by emulsion polymerization with a thermoplastic polymer having a melt viscosity different from that of said polymer and remove the unnecessary volatile matters which may bring about deterioration of properties of products. Furthermore, when there are no difficulties in mixing which may be caused by the difference in melt viscosity, this invention is also useful in improvement of quality of products, but the greatest advantage is in providing a method for producing a thermoplastic resin from a latex of emulsion polymer at low cost and in a rationalized manner.

The following examples and reference examples illustrate the method of this invention and effects attained by this invention. The parts in these examples and reference examples are all by weight.

EXAMPLE 1

Acrylonitrile and styrene were graft polymerized on polybutadiene latex of 0.36 μm in average particle diameter in accordance with the formulation of Table 1 to obtain a latex of graft rubber polymer.

TABLE 1

| | | |
|---|---|---|
| Polybutadiene latex | 114.3 | parts |
| (polybutadiene | 40 | parts) |
| Acrylonitrile | 15 | parts |
| Styrene | 45 | parts |
| Sodium laurate | 0.5 | part |
| Sodium hydroxide | 0.01 | part |
| Rongalite | 0.2 | part |
| Ferrous sulfate | 0.002 | part |
| EDTA-di-sodium salt | 0.1 | part |
| Tertiary-butyl hydroperoxide | 0.3 | part |
| Lauryl mercaptan | 0.6 | part |
| Deionized water | 125 | parts |
| Polymerization temperature | 70° | C. |
| Polymerization time | 240 | minutes |

An acrylonitrile-styrene copolymer as a thermoplastic polymer was prepared in accordance with the formulation of Table 2.

TABLE 2

| | | |
|---|---|---|
| Acrylonitrile | 25 | parts |
| Styrene | 75 | parts |
| Azobisisobutyronitrile | 0.3 | part |
| Lauryl mercaptan | 0.5 | part |
| POVAL (polyvinyl alcohol, polymetization degree 900) | 0.07 | part |
| Sodium sulfate | 0.3 | part |
| Water | 250 | parts |
| Polymerization temperature | 75° | C. |
| Polymerization time | 240 | minutes |

After completion of polymerization, the resultant suspension of acrylonitrile-styrene copolymer was subjected to centrifugal dehydration and dried at 80° C. to obtain a powder of said copolymer.

Then, 300 parts of said latex of graft rubber polymer, 50 parts of toluene, 1000 parts of 0.1 wt. % aqueous dilute sulfuric acid solution, 0.1% by weight (based on the weight of all the polymers) of Irganox 1076 (trade mark for aging resister of Ciba-Geigy Co.) and 0.5% by weight (based on the weight of all the polymers) of Armide HT (trade mark for molding assistant of Lion Armour Co.) were mixed to obtain a mixture which separated into an aqueous phase and a high viscous organic phase. The organic phase was taken out and passed through two press rolls to remove superfluous aqueous phase. The organic phase was fed from a first feed opening of an extruder having two feed openings and two vent holes and having no kneading mechanism. A part of toluene contained in the polymer was devolatilized from the first vent holes, 150 parts of said copolymer was fed from the second feed opening provided just behind the first vent hole, the remaining toluene was devolatilized from the second vent hole provided down the second feed opening and the polymer was molded into pellets. The proportion of amounts of toluene devolatilized from the first vent hole and the second vent hole was about 3:2. Thus obtained pellets had a smooth surface and had no inhomogeneous portions called "fish eyes". These pellets were injection molded to make test pieces and properties thereof were measured to obtain the results as shown in Table 3. These results show the superiority of the rubber modified thermoplastic resin obtained in this Example.

TABLE 3

| Item | Test methods* | Results |
|---|---|---|
| Tensile yield strength | ASTM D-638 (at 20° C.) | 500 kg/cm$^2$ |
| Izod impact strength | ASTM D-256 (at 20° C., ¼", notched) | 32 kg cm/cm |

TABLE 3-continued

| Item | Test methods* | Results |
|---|---|---|
| | (at 0° C., ¼", notched) | 25 kg cm/cm |
| Rockwell hardness | ASTM D-785 (R scale) | 110 |
| Melt flow rate | ASTM D-1238 (at 200° C., 5 kg) | 2.2 g/10 min |

*Same in the following Examples 2, 5-7 and 9 and Reference Example

EXAMPLE 2

A latex of graft rubber polymer was prepared using the same agents as in Example 1 in accordance with the formulation of Table 4.

TABLE 4

| Polybutadiene latex | 168 parts |
|---|---|
| (Polybutadiene | 60 parts) |
| Acrylonitrile | 11 parts |
| Styrene | 29 parts |
| Sodium laurate | 0.4 part |
| Sodium hydroxide | 0.01 part |
| Rongalite | 0.15 part |
| Ferrous sulfate | 0.001 part |
| EDTA-di-sodium salt | 0.05 part |
| Tertiary-butyl peroxide | 0.2 part |
| Luaryl mercaptan | 0.3 part |
| Deionized water | 50 parts |
| Polymerization temperature | 70° C. |
| Polymerization time | 280 minutes |

When 75 parts of thus obtained latex of graft rubber polymer, 25 parts of ethylbenzene and 40 parts of 1 wt. % aluminum sulfate were continuously mixed by a continuous type kneader, the resulting mixture separated into two phase as in Example, 1. This was continuously fed to an extruder having successively a first feed opening, a dehydrating part, a first devolatilizing part, a second feed opening and a second devolatilizing part and after dehydration and the first devolatilization, 71 parts of the acrylonitrile-styrene copolymer used in Example 1 was fed from the second feed opening and then the second devolatilization was carried out. The mixture was molded into pellets. The proportion of amounts of ethylbenzene devolatilized at the first stage and at the second stage was about 9:1. The surface of the pellets obtained was smooth and there were no fish eyes. These pellets were injection molded to make test pieces and properties thereof were measured to obtain the results as shown in Table 5. These results indicate that the rubber modified thermoplastic resin obtained in this Example was superior.

TABLE 5

| Items | Results |
|---|---|
| Tensile yield strength | 475 Kg/cm² |
| Izod impact strength | 35 Kg cm/cm (at 20° C.) |
| " | 28 Kg cm/cm (at 0° C.) |
| Rockwell hardness | 106 |
| Melt flow rate | 1.9 g/10 min. |

EXAMPLE 3

Methyl methacrylate and methyl acrylate were graft polymerized on SBR rubber latex of 0.14 μm in average particle diameter in accordance with the formulation of Table 6 to obtain a latex of graft rubber polymer.

TABLE 6

| SBR rubber latex | 100 parts |
|---|---|
| (SBR rubber | 50 parts) |

TABLE 6-continued

| Methyl methacrylate | 45 parts |
|---|---|
| Methyl acrylate | 5 parts |
| Potassium rosinate | 1 part |
| Rongalite | 0.2 part |
| Ferrous sulfate | 0.003 part |
| EDTA-di-sodium salt | 0.1 part |
| Cumene hydroperoxide | 0.4 part |
| Octyl mercaptan | 0.2 part |
| Deionized water | 150 parts |
| Polymerization temperature | 65° C. |
| Polymerization time | 240 minutes |

Polymethyl methacrylate as a thermoplastic polymer was produced in accordance with the formulation of Table 7.

TABLE 7

| Methyl methacrylate | 100 parts |
|---|---|
| Azobisisobutyronitrile | 0.3 part |
| Lauryl mercaptan | 0.5 part |
| Poval (Polyvinyl alcohol. polymerization degree 900) | 0.07 part |
| Sodium sulfate | 0.25 part |
| Water | 200 parts |
| Polymerization temperature | 80° C. |
| Polymerization time | 180 minutes |

After completion of polymerization, the obtained suspension of polymethyl methacrylate was subjected to centrifugal dehydration and dried at 80° C. to obtain a powder of the polymer.

Then, 90 parts of said latex of graft polymer, 100 parts of chloroform and 300 parts of a 0.5 wt. % dilute aqueous magnesium sulfate solution were continuously mixed by a continuous type kneader to obtain a mixture which separated into an aqueous phase and a high viscous organic phase. This mixture was subjected to removal of the aqueous phase and the first devolatilization of chloroform in the same apparatus as used in Example 2 and successively 70 parts of said polymethyl methacrylate was continuously fed from the resin feed opening provided in this apparatus to melt-mix with the graft polymer and further the second devolatilization was carried out. Then, the mixture was pelletized. Thus obtained pellets had a smooth surface and had no fish eyes. These pellets were injection molded to make test pieces and properties thereof were measured to obtain the results as shown in Table 8. These results indicate the superiority of the rubber modified thermoplastic resin produced in this Example.

TABLE 8

| Items | Test methods* | Results |
|---|---|---|
| Total light transmission | ASTM D-1003 | 90% |
| Dynstat impact strength | DIN 53453 | 19 Kg cm/cm |
| Rockwell hardness | ASTM D-785 (M scale) | 77 |

*Same test methods were used in Example 8, too.

EXAMPLE 4

Acrylonitrile and α-methylstyrene were emulsion polymerized in accordance with the formulation of Table 9 to obtain a latex of polymer.

TABLE 9

| Acrylonitrile | 25 parts |
|---|---|
| α-Methylstyrene | 75 parts |
| Potassium persulfate | 0.5 part |
| Sodium bicarbonate | 0.2 part |
| Sodium laurate | 1.8 part |

TABLE 9-continued

| | | |
|---|---|---|
| t-Dodecyl mercaptan | 0.5 | part |
| Deionized water | 180 | parts |
| Polymerization temperature | 65° | C. |
| Polymerization time | 240 | minutes |

140 parts of thus obtained latex, 100 parts of a 1 wt. % aqueous sulfuric acid solution and 10 parts of toluene were continuously fed to an apparatus having successively a feed opening for the polymer latex, aqueous sulfuric acid solution and toluene, a mixing part, a dehydrating part, a first devolatilizing part, a feed opening for resin and a second devolatilizing part and water separated in the apparatus was discharged from the dehydrating part. Then, about 50% by weight of the volatile components mainly composed of toluene were devolatilized from the first devolatilizing part by heating. Thereafter, 50 parts of the same acrylonitrile-styrene copolymer as used in Example 1 was continuously fed from the resin feed opening provided down the first devolatilizing part to mix with the acrylonitrile-methylstyrene copolymer. Then, toluene remaining in thus obtained thermoplastic resin mixture was devolatilized from the second devolatilizing part and thereafter, the resin mixture was extruded from the apparatus into strands, which were pelletized. After drying, the pellets were injection molded into a transparent sheet of 3 mm thick. Vicat softening point (load 5 Kg) of this sheet according to ISO R-306 was measured to obtain 119° C. Rockwell hardness HRM of the sheet was 93. These results show that the thermoplastic resin produced in this Example was excellent as a heat resistant resin.

EXAMPLE 5

A thermoplastic resin was obtained in the same manner as in Example 1 except that a polycarbonate (Novalex 7022 manufactured by Mitsubishi Chemical Industries Ltd.) was used in place of the acrylonitrile-styrene copolymer. Thus obtained resin was homogeneous and had no fish eyes. Properties of the resin are shown in Table 10.

TABLE 10

| Items | Test method | Results |
|---|---|---|
| Tensile yield strength | ASTM D-638 (at 20° C.) | 460 Kg/cm$^2$ |
| Izod impact strength | ASTM D-256 (at 20° C., ¼", notched) | 52 Kg cm/cm |
| Rockwell hardness | ASTM D-785 (R scale) | 111 |
| Melt flow rate | ASTM D-1238 (at 200° C., 5 Kg) | 0.2 g/10 min |

REFERENCE EXAMPLE

The emulsion polymerization latex used in Example 1 was coagulated with sulfuric acid by a conventional method, dehydrated and dried to obtain a dry powder. This was mixed with the same polycarbonate as used in Example 5 and other assistants at the same ratio as in Example 1. Strands were produced from the mixture at the same temperature and the same devolatilizing conditions using the same extruder as used in Example 1 except that nothing was fed from the second feed opening. Thus obtained strands were inhomogeneous and it appeared that mixing or kneading of the polymer obtained by emulsion polymerization and the polycarbonate was insufficient.

EXAMPLE 6

When 300 parts of the same latex of graft polymer as in Example 1, 50 parts of toluene, 1000 parts of a 0.1 wt. % dilute aqueous sulfuric acid solution and 0.1% by weight (based on all the polymers) of Irganox 1076 and 0.5% by weight (based on all the polymers) of Armide HT were mixed, the resulting mixture separated into an aqueous phase and a high viscous organic phase. The organic phase was taken out and passed through two press rolls to remove remaining aqueous phase, toluene contained in the high viscous organic phase was devolatilized by a vented extruder and 150 parts of the same acrylonitrile copolymer powder as in Example 1 was fed and then the polymer was molded into pellets. These pellets had a smooth surface and had no fish eyes. These were injection molded to make test pieces and properties thereof were measured to obtain the results as shown in Table 11. These results show the superiority of the rubber modified thermoplastic resin produced in this Example.

TABLE 11

| Items | Results |
|---|---|
| Tensile yield strength | 485 Kg/cm$^2$ |
| Izod impact strength | 31 Kg cm/cm (at 20° C.) |
| " | 24 Kg cm/cm (at 0° C.) |
| Rockwell hardness | 109 |
| Melt flow rate | 2.2 g/10 min. |

EXAMPLE 7

When 75 parts of the same graft rubber latex as in Example 2, 25 parts of ethylbenzene and 40 parts of a 1 wt. % aluminum sulfate were continuously mixed by a continuous kneader, the resulting mixture separated into two phases as in Example 6. This was continuously fed to an extruder having a dehydrating mechanism and was subjected to dehydration and devolatilization and thereafter, 71 parts of the acrylonitrile-styrene copolymer used in Example 1 was fed from a resin feed opening provided at this extruder and the mixture was molded into pellets. Thus obtained pellets had a smooth surface and had no fish eyes. These were injection molded to make test pieces and properties thereof were measured in the same manner as in Example 1 to obtain the results as shown in Table 12. These results indicate that the rubber modified thermoplastic resin produced in this Example was superior.

TABLE 12

| Items | Results |
|---|---|
| Tensile yield strength | 470 Kg/cm$^2$ |
| Izod impact strength | 34 Kg cm/cm (at 20° C.) |
| " | 28 Kg cm/cm (at 0° C.) |
| Rockwell hardness | 105 |
| Melt flow rate | 2.0 g/10 min. |

EXAMPLE 8

When 90 parts of the same latex of graft polymer as in Example 3, 100 parts of chloroform and 300 parts of a 0.5 wt. % dilute aqueous magnesium sulfate solution were continuously mixed by a continuous type kneader, the resulting mixture separated into an aqueous phase and a high viscous organic phase. This mixture was fed to the same apparatus as used in Example 7 and removal of the aqueous phase and devolatilization of chloroform were effected in the apparatus, followed by continuous feeding of 70 parts of said polymethyl methacrylate powder from the feed opening for resin to melt-mix with the graft polymer and pelletization of the mixture was carried out. The surface of thus obtained pellets was smooth and no fish eyes were seen. These were further injection molded to make test pieces and properties thereof were measured in the same manner as in Example 3 to obtain the results as shown in Table 13. These results show the superiority of the rubber modified thermoplastic resin produced in this Example.

TABLE 13

| Items | Results |
| --- | --- |
| Total light transmission | 88% |
| Dynstat impact strength | 19 Kg cm/cm$^2$ |
| Rockwell hardness | 76 |

EXAMPLE 9

140 parts of the same latex as in Example 4, 100 parts of a 1 wt. % aqueous sulfuric acid solution and 10 parts of toluene were continuously fed to an apparatus having successively a feed opening for the polymer latex, the aqueous sulfuric acid solution and toluene, a mixing part, a dehydrating part, a devolatilizing part, a feed opening for resin and a melt-mixing part and water separated in the apparatus was discharged from the dehydrating part. Volatile components mainly composed of toluene were devolatilized from the devolatilizing part by heating and then 50 parts of the same acrylonitirle-styrene copolymer as used in Example 5 was continuously fed from the resin feed opening provided down the devolatilizing part to melt-mix with the acrylonitrile-α-methylstyrene copolymer.

Then, thus obtained thermoplastic resin mixture was extruded into strands from the apparatus and they were pelletized and dried. These pellets were injection molded into a transparent sheet of 3 mm thick. Vicat softening point (load 5 Kg) of this sheet according to ISO R-306 was measured to obtain 116° C. Rockwell hardness HRM of the sheet was 92. These results show that the thermoplastic resin produced in this Example was excellent as a heat resistant resin.

As is clear from the above explanation, according to the method of this invention, operations of coagulating polymer latex to make wet powder and dehydrating and drying the wet powder are not required and especially because heat loss at drier can be avoided, it has become possible to produce thermoplastic resins of high competitiveness in cost. Furthermore, in this invention, water is separated with an organic agent and so discharging of water is easy and there is no problem of clogging of the aperture provided at barrel part of the conventional dehydration extruder. Besides, since highly viscous polymer is dealt with, no consideration is necessary for wearing-out of apparatus. In addition, the evaporation latent heat of the organic agent is generally markedly smaller than water and reduction of quantity of heat can be accomplished.

Thus, this invention has a high industrial value.

What is claimed is:

1. A method for producing a thermoplastic resin, which comprises:
    (a) substantially removing an aqueous phase from a two-phase mixture comprising:
        (i) a latex of a polymer (1), produced by emulsion polymerization,
        (ii) a water-soluble coagulating agent (2) in an amount of about 10% by weight or less of said first polymer, and
        (iii) an organic agent (3), in an amount of 0.1 to 6 times the weight of said polymer (1), which agent is capable of dissolving uncrosslinked polymer of said polymer (1), and which agent has a solubility in water of 5% by weight or less at 25° C.;
    (b) subjecting the resulting mixture, which substantially comprises the polymer (1) and said organic agent (3), and which is substantially free of an aqueous phase, to a devolatization treatment by heating to form a molten polymer, thereby removing said organic agent (3) and remaining water; and then
    (c) melt-mixing said molten polymer with a thermoplastic polymer (4').

2. The method for producing a thermoplastic resin, according to claim 1, wherein the latex of the polymer (1) produced by emulsion polymerization is a latex produced by graft polymerization of at least one monomer selected from the group consisting of vinyl cyanide monomers, vinyl aromatic monomers and methacrylate monomers on a rubber polymer latex.

3. The method for producing a thermoplastic resin, according to claim 1, wherein the water soluble coagulating agent (2) is a salt of a polyvalent metal or an inorganic acid or a mixture thereof.

4. The method for producing a thermoplastic resin, according to claim 1, wherein the thermoplastic polymer (4') is at least one polymer selected from the group consisting of acrylonitrile-styrene copolymer, polycarbonate, polyvinylchloride and polysulfone.

5. A method for producing a thermoplastic resin, which comprises:
    (a) substantially removing an aqueous phase from a two-phase mixture comprising:
        (i) a latex of a polymer (1), produced by emulsion polymerization,
        (ii) a water-soluble coagulating agent (2) in an amount of 10% by weight or less of said polymer (1), and
        (iii) an organic agent (3), in an amount of 0.1 to 6 times the weight of said polymer (1), which agent is capable of dissolving both uncrosslinked polymer of said polymer (1), and a thermoplastic polymer (4), and which agent has a solubility in water of 5% by weight or less at 25° C.;
    (b) subjecting the resulting mixture, which substantially comprises the polymer (1) and said organic agent (3), and which is substantially free of an aqueous phase, to a first devolatization treatment by heating to form a molten polymer, thereby removing a portion of said organic agent (3), and remaining water;
    (c) melt-mixing said molten polymer with a thermoplastic polymer (4); and then
    (d) subjecting the mixture to a second devolatization treatment, thereby removing the remainder of said organic agent (3).

6. The method for producing a thermoplastic resin, according to claim 5, wherein the latex of the polymer (1) produced by emulsion polymerization is a latex prepared by graft polymerization of at least one monomer selected from the group consisting of vinyl cyanide monomers, vinyl aromatic monomers and methacrylate monomers on a rubber polymer latex.

7. The method for producing a thermoplastic resin, according to claim 5, wherein the water soluble coagulating agent (2) is a salt of a polyvalent metal or an inorganic acid or a mixture thereof.

8. The method for producing a thermoplastic resin, according to claim 5, wherein the thermoplastic polymer (4) is at least one polymer selected from the group consisting of acrylonitrile-styrene copolymer, polycarbonate, polyvinylchloride and polysulfone.

* * * * *